(12) United States Patent
McMahan et al.

(10) Patent No.: US 10,337,404 B2
(45) Date of Patent: Jul. 2, 2019

(54) PREFERENTIAL COOLING OF GAS TURBINE NOZZLES

(75) Inventors: Kevin Weston McMahan, Greer, SC (US); Joseph V. Citeno, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1261 days.

(21) Appl. No.: 12/719,674

(22) Filed: Mar. 8, 2010

(65) Prior Publication Data
US 2011/0217159 A1 Sep. 8, 2011

(51) Int. Cl.
*F01D 9/02* (2006.01)
*F01D 9/04* (2006.01)
*F01D 25/08* (2006.01)
*F02C 7/12* (2006.01)

(52) U.S. Cl.
CPC .............. *F02C 7/12* (2013.01); *F01D 9/023* (2013.01); *F01D 9/04* (2013.01); *F01D 25/08* (2013.01); *F05D 2240/128* (2013.01); *F05D 2260/20* (2013.01); *Y02T 50/676* (2013.01)

(58) Field of Classification Search
CPC ...... F01D 9/02; F01D 9/04; F02C 7/12; F05B 2240/12; F05B 2240/123; F05D 2240/12; F05D 2240/128
USPC .......................................... 415/115, 139, 191
See application file for complete search history.

(56) References Cited

U.S. PATENT DOCUMENTS

| | | | |
|---|---|---|---|
| 4,733,538 A | 3/1988 | Vdoviak et al. | |
| 5,813,832 A | 9/1998 | Rasch et al. | |
| 6,065,928 A | 5/2000 | Rieck, Jr. et al. | |
| 6,071,363 A * | 6/2000 | O'Connor et al. | ........... 148/559 |
| 6,079,943 A | 6/2000 | Sexton et al. | |
| 6,142,734 A | 11/2000 | Lee | |
| 6,250,061 B1 | 6/2001 | Orlando | |
| 6,382,906 B1 * | 5/2002 | Brassfield et al. | ........... 415/115 |
| 6,390,769 B1 | 5/2002 | Burdgick et al. | |
| 6,554,562 B2 * | 4/2003 | Dudebout et al. | ................ 415/1 |
| 6,572,330 B2 * | 6/2003 | Burdgick | ...................... 415/191 |
| 6,609,880 B2 * | 8/2003 | Powis et al. | ...................... 415/1 |
| 6,840,048 B2 * | 1/2005 | Han et al. | ...................... 60/772 |
| 6,887,033 B1 | 5/2005 | Phillips et al. | |
| 6,929,445 B2 | 8/2005 | Zatorski et al. | |

(Continued)

FOREIGN PATENT DOCUMENTS

| | | |
|---|---|---|
| CN | 1497217 A | 5/2004 |
| CN | 101328814 A | 12/2008 |

(Continued)

OTHER PUBLICATIONS

Japanese Office Action—Final Rejection and English Translation; Application No. JP2011-048430; dated Mar. 17, 2015; 5 pages.

(Continued)

*Primary Examiner* — Igor Kershteyn
*Assistant Examiner* — Christopher R Legendre
(74) *Attorney, Agent, or Firm* — Fletcher Yoder, P.C.

(57) ABSTRACT

Turbine nozzle assemblies include a plurality of circumferentially spaced first components and second components, which are designed to provide different amounts of cooling. The second components, which are generally aligned with an opening of transition pieces, are designed to provide more cooling than the first components, which are generally aligned with interfaces between the transition pieces.

20 Claims, 9 Drawing Sheets

(56) References Cited

U.S. PATENT DOCUMENTS

| | | |
|---|---|---|
| 6,929,446 B2 | 8/2005 | Lu et al. |
| 7,008,178 B2 * | 3/2006 | Busch et al. .................. 415/115 |
| 7,029,228 B2 | 4/2006 | Chan et al. |
| 7,101,150 B2 * | 9/2006 | Bash et al. ..................... 415/191 |
| 7,121,787 B2 | 10/2006 | Jacks et al. |
| 7,121,796 B2 | 10/2006 | Burdgick et al. |
| 7,140,835 B2 | 11/2006 | Lee et al. |
| 7,147,432 B2 * | 12/2006 | Lowe et al. .................. 415/116 |
| 7,296,967 B2 | 11/2007 | Shapiro |
| 7,303,372 B2 | 12/2007 | West et al. |
| 7,341,427 B2 | 3/2008 | Farmer et al. |
| 7,377,742 B2 | 5/2008 | Shapiro et al. |
| 7,387,488 B2 | 6/2008 | Nichols et al. |
| 7,503,749 B2 | 3/2009 | Lee et al. |
| 7,588,412 B2 | 9/2009 | Nichols et al. |
| 7,604,453 B2 | 10/2009 | Lee et al. |
| 7,625,170 B2 | 12/2009 | Greene et al. |
| 7,836,703 B2 * | 11/2010 | Lee et al. ......................... 60/806 |
| 8,205,458 B2 * | 6/2012 | Lee et al. ......................... 60/806 |
| 2003/0113201 A1 * | 6/2003 | Powis et al. ...................... 415/1 |
| 2005/0254944 A1 | 11/2005 | Bash et al. |
| 2008/0131260 A1 | 6/2008 | Lee et al. |
| 2008/0317585 A1 * | 12/2008 | Lee et al. ....................... 415/115 |
| 2010/0129196 A1 * | 5/2010 | Johnston et al. ............. 415/115 |
| 2010/0232944 A1 * | 9/2010 | Hatman ........................ 415/177 |
| 2011/0217159 A1 * | 9/2011 | McMahan et al. ............ 415/115 |

FOREIGN PATENT DOCUMENTS

| | | |
|---|---|---|
| EP | 1213444 A2 | 6/2002 |
| EP | 1927725 A2 | 6/2008 |
| JP | 62-121835 A | 6/1987 |
| JP | 10-331659 A | 12/1998 |
| JP | 11-117705 A | 4/1999 |
| JP | 2003-184506 A | 7/2003 |
| JP | 2003-322003 A | 11/2003 |
| JP | 2008-139011 A | 6/2008 |
| WO | 2009/083456 A2 | 7/2009 |

OTHER PUBLICATIONS

Chinese Office Action dated Jul. 31, 2014; Application No. 201110063987.8.

Chinese Office Action dated Mar. 28, 2014; Publication No. CN1140832 A, Published Jan. 22, 1997; Application No. CN96110585, Filed Jul. 15, 1996; 9 pages.

Japanese Office Action & English Summary; Application No. 2011-048430; dated Oct. 21, 2014; 4pages.

Extended European Search Report and Opinion issued in connection with corresponding EP Application No. 11156996.8 dated Mar. 1, 2018.

* cited by examiner

PREFERENTIAL COOLING OF GAS TURBINE NOZZLES

BACKGROUND OF THE INVENTION

The subject matter disclosed herein relates to gas turbine nozzles, and more specifically, to preferential cooling of gas turbine nozzles.

In general, gas turbines combust a mixture of compressed air and fuel to produce hot combustion gases. The combustion gases may flow through one or more turbines to generate power for a load and/or a compressor. Within the gas turbines, the combustion gases may flow through one or more stages of nozzles and blades. The turbine nozzles may include circumferential rings of vanes that direct the combustion gases to the blades. As the combustion gases flow past the blades, the combustion gases may apply motive forces to the blades, thereby causing the blades to rotate and generate power for the load and/or for the compressor. Due to the high temperature of the combustion gases, the nozzles can be cooled.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a turbine engine includes a turbine nozzle assembly with a plurality of circumferentially spaced first components and second components and a plurality of transition pieces each defining a hot gas path from a combustor to the turbine nozzle assembly. The first components are generally aligned with interfaces between two transition pieces of the plurality of transition pieces, the second components are generally aligned with openings of individual transition pieces of the plurality of transition pieces, and the second components are configured to provide more cooling than the first components.

In a second embodiment, a turbine engine includes a turbine nozzle assembly with a plurality of circumferentially spaced vanes each extending between a plurality of band segments, a plurality of transition pieces each defining a hot gas path from a combustor to the turbine nozzle assembly, a first component that includes at least one vane of the plurality of circumferentially spaced vanes or at least one band segment of the plurality of band segments, and a second component that includes at least one vane of the plurality of the circumferentially spaced vanes or at least one band segment of the plurality of band segments. The second component is disposed at or adjacent to an interface between the transition pieces and is configured to provide less cooling than the first component.

In a third embodiment, a turbine engine includes a turbine nozzle assembly, a plurality of combustors, and a plurality of transition pieces each defining a hot gas path from a combustor of the plurality of combustors to the turbine nozzle assembly. The turbine nozzle assembly includes a first annular ring of inner band segments, a second annular ring of outer band segments disposed about the first annular ring, a plurality of first vanes extending between the first and second annular rings, and a plurality of second vanes extending between the first and second annular rings. Individual first vanes of the plurality of first vanes are generally aligned with interfaces between the two transition pieces of the plurality of transition pieces, and individual second vanes of the plurality of second vanes are generally aligned with the combustors. The individual first vanes include fewer cooling holes than the individual second vanes.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
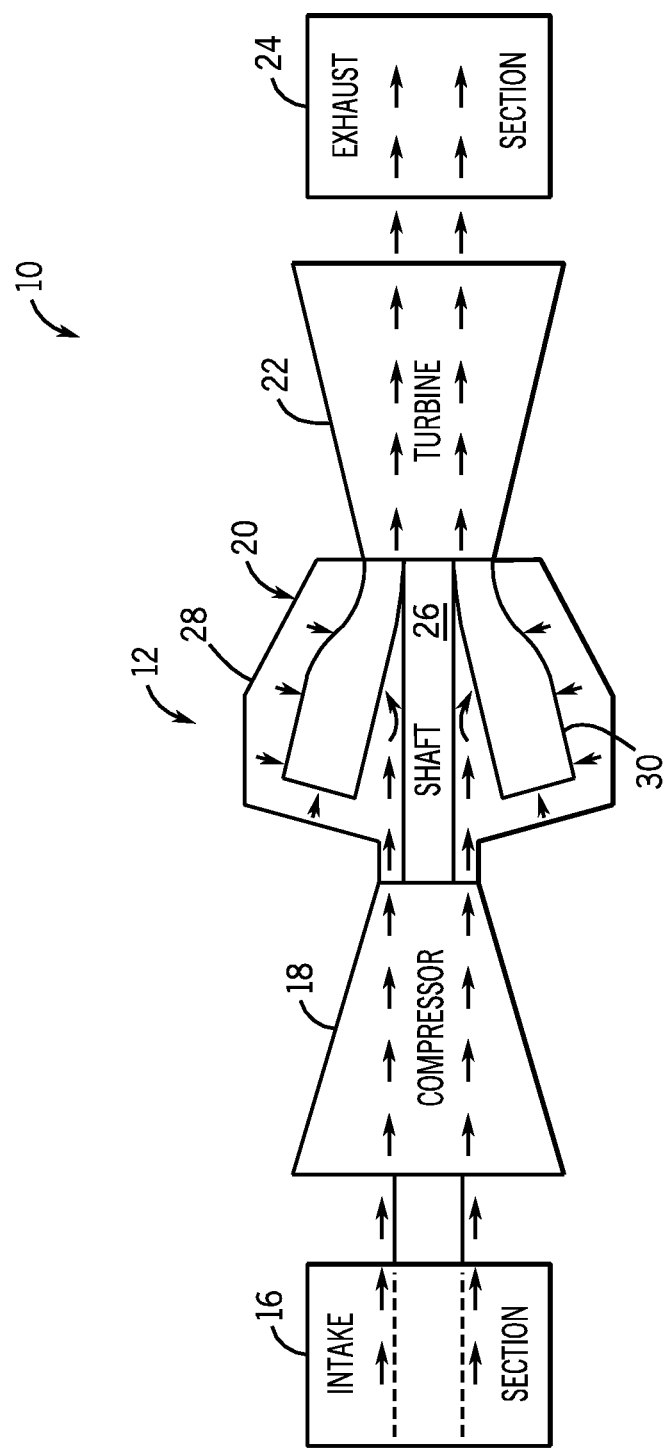
FIG. 1 is a schematic flow diagram of an embodiment of a gas turbine engine that may employ preferential nozzle cooling.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbines that include nozzle assemblies designed to provide preferential cooling. In particular, the nozzle assemblies may be designed to provide more cooling to hotter areas of the nozzle assemblies and less cooling to cooler areas of the nozzle assemblies. Each nozzle assembly may include a circumferential ring of vanes extending between inner and outer band segments. Each nozzle assembly also may include shroud segments disposed downstream of the vanes. The shroud segments may extend generally adjacent to the outer band segments to direct combustion gases to blades of the gas turbine.

During operation, certain portions of the nozzle assembly may be hotter than others. Accordingly, rather than employing identical vanes, band segments, and/or shroud segments, at least some of the vanes, band segments, and/or shroud segments may be designed to provide different amounts of cooling. For example, vanes, band segments, and/or shroud segments located in hotter portions of the nozzle may be designed to provide more cooling while vanes, band segments, and/or shroud segments located in cooler portions of the nozzle assembly may be designed to provide less cooling. According to certain embodiments, at least some of the vanes, band segments, and/or the shroud segments may include different numbers of cooling holes. Further, in certain embodiments, cooling holes of different sizes and/or geometries may be employed. Moreover, vane inserts, band covers and/or shroud covers may be employed that have different numbers, shapes, and/or sizes of cooling holes. The preferential cooling of nozzle assemblies may decrease the amount of compressor discharge air sufficient for cooling, thereby allowing more of the compressor discharge air to be employed for combustion, which, in turn may increase the efficiency of the gas turbine engine.

FIG. 1 depicts an exemplary system 10 including a gas turbine engine 12 that may employ nozzle assemblies designed for preferential cooling. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22. According to certain embodiments, multiple combustors 30 may be disposed in an annular arrangement within the combustor housing 28.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
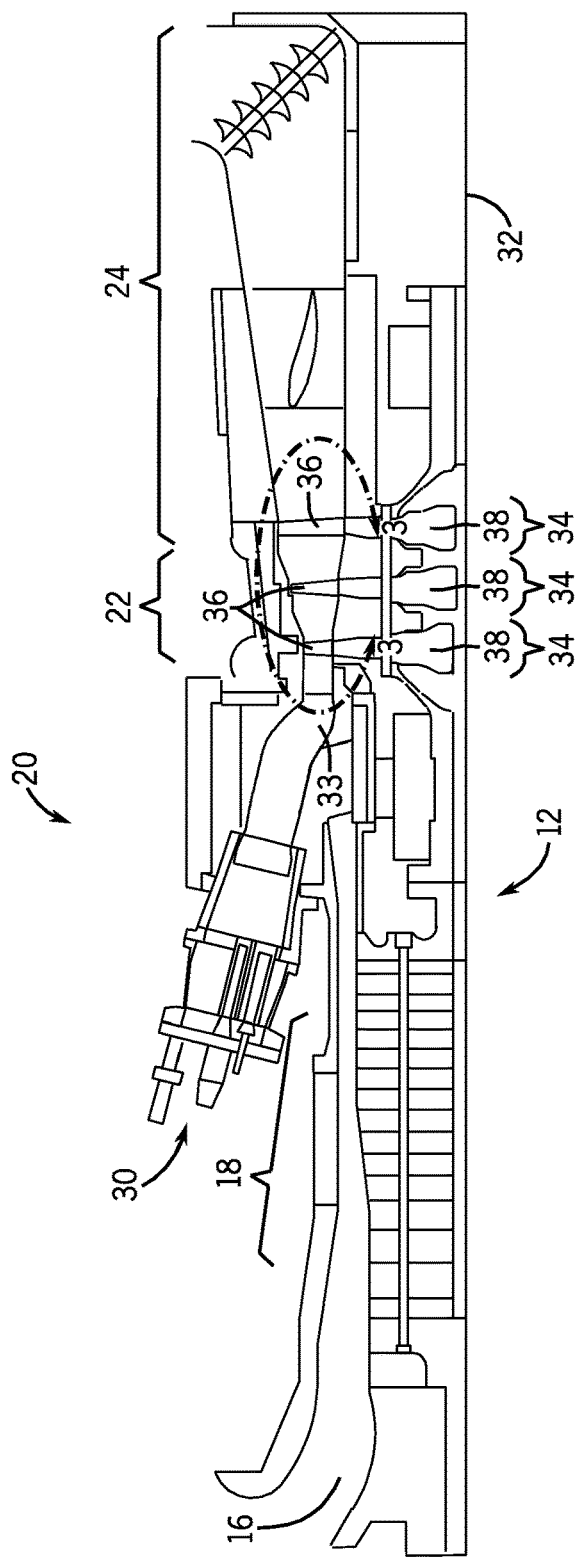
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis 32. As described above with respect to FIG. 1, air may enter the gas turbine engine 12 through the air intake section 16 and may be compressed by the compressor 18. The compressed air from the compressor 18 may then be directed to the combustors 30 where the compressed air may be mixed with fuel gas to generate hot combustion gases. As noted above, multiple combustors 30 may be annularly disposed within the combustor section 20. Each combustor 30 may include a transition piece 33 that directs the hot combustion gases from the combustor 30 to the gas turbine 22. In particular, each transition piece 33 may generally define a hot gas path from the combustor 30 to a nozzle assembly of the turbine 22.

As depicted, the gas turbine 22 includes three separate stages 34. Each stage 34 may include a set of blades 36 coupled to a rotor wheel 38 that may be rotatably attached to the shaft 26 (FIG. 1). Each stage 34 also may include a nozzle assembly 44 (FIG. 3) disposed directly upstream of each set of blades 36. The nozzle assemblies 44 may direct the hot combustion gases toward the blades 36 where the hot combustion gases may apply motive forces to the blades 36 to rotate the blades 36, thereby turning the shaft 26. The hot combustion gases may then exit the gas turbine 22 through the exhaust section 24.

Although the turbine 22 is illustrated as a three-stage turbine, the nozzle assemblies described herein may be employed in any suitable type of turbine with any number of stages and shafts. For example, the nozzle assemblies may be included in a single stage gas turbine, in a dual turbine system that includes a low-pressure turbine and a high-pressure turbine, or in a steam turbine.

Figure 3:
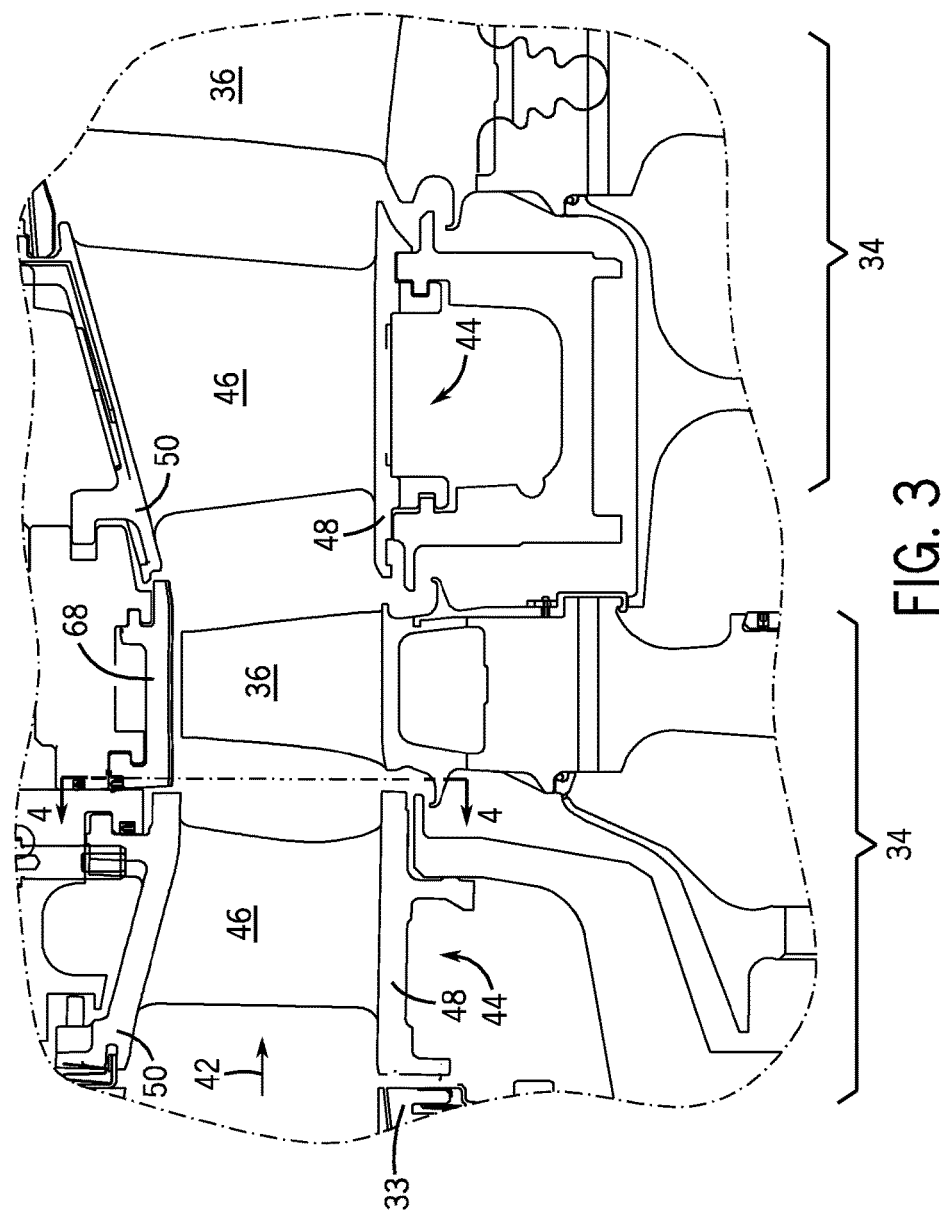
FIG. 3 is a partial sectional view of the gas turbine engine of FIG. 2 taken within line 3-3 and showing an embodiment of a turbine nozzle assembly.

FIG. 3 is a detailed view of an embodiment of the turbine 22 taken within line 3-3 of FIG. 2. The hot combustion gases may flow from the combustors 30 (FIG. 1) through the transition pieces 33 into the turbine 22 in a direction 42, generally illustrated by an arrow. The turbine 22 includes nozzle assemblies 44 within each stage 34 that direct the hot combustion gases towards the blades 36. Each nozzle assembly 44 may include circumferentially spaced vanes 46 that extend between inner and outer band segments 48 and 50. Adjacent outer band segments 50 may be coupled together to form an outer annular ring extending around an inner annular ring of adjacent inner band segments 48. The vanes 46 may generally extend between the two annular rings formed by the inner and outer band segments 48 and 50.

Shroud segments 68 may be disposed downstream of the outer band segments 50 to direct hot combustion gases flowing past the vanes 46 to the blades 36. In particular, shroud segments 68 may be coupled together to form an outer annular ring that generally aligns with the outer annular ring formed by outer band segments 50. Discharge air from the compressor 18 (FIG. 2) may be directed through the vanes 46, the inner and outer band segments 48 and 50, and the shroud segments 68 to provide cooling of the vanes 46, the inner and outer band segments 48 and 50, and the shroud segments 68. The nozzle assemblies described herein may be employed in the first stage, second stage, third stage, or combinations thereof.

Figure 4:
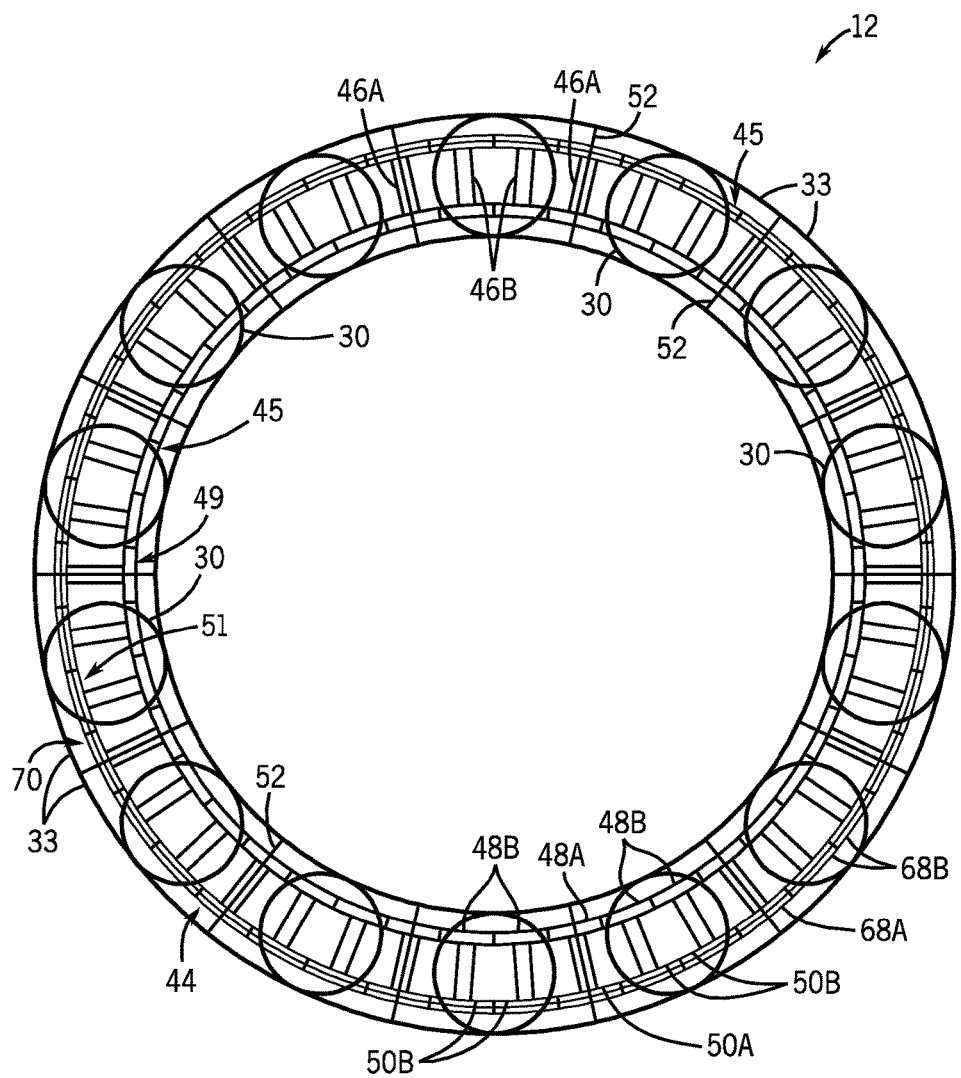
FIG. 4 is a cross-sectional view of the turbine nozzle assembly of FIG. 3 taken along line 4-4.

FIG. 4 is a cross-sectional view of the turbine 22 and the combustors 30 taken along line 4-4 of FIG. 3. As shown in FIG. 4, the gas turbine engine 12 includes combustors 30 circumferentially spaced to form an annular ring. Although fourteen combustors 30 are shown in FIG. 4, in other embodiments, any number of combustors 30 may be included within the gas turbine engine 12. Each combustor 30 is generally aligned with a transition piece 33 that directs the hot combustion gases produced within the combustor 30 through an opening of 45 of the transition piece 33 to the nozzle assembly 44. Within the nozzle assembly 44, vanes 46 are circumferentially spaced and extend between inner and outer band segments 48 and 50. In particular, the vanes 46 extend between the inner and outer annular rings 49 and 51 formed by the inner and outer band segments 48 and 50. Vanes 46A are generally aligned with interfaces 52 between the transition pieces 33 while vanes 46B are generally aligned with a combustor 30 and a transition piece opening 45. As shown, each vane 46A is surrounded by a pair of vanes 46B. However, in other embodiments, the number of vanes 46B aligned with the combustors 30 and/or with the interfaces 52 may vary. Moreover, in other embodiments, the vanes 46A may be offset from the transition piece interfaces 52 to be disposed near the transition piece interfaces 52.

An outer annular ring 70 of shroud segments 68 extends annularly along the outer annular ring 51 of outer band segments 50. Shroud segments 68A are aligned with the transition piece interfaces 52 while shroud segments 68B are generally aligned with the combustors 30 and the transition piece openings 45. As shown, shroud segments 68A are generally aligned with outer band segments 50A while shroud segments 68B are generally aligned with outer band segments 50B. However, in other embodiments the shroud segments 68A and 68B and the band segments 50A and 50B may be offset from one another.

The combustors 30 may generally create a repeatable pattern of cold and hot regions within the nozzle assembly 44. In particular, colder areas may exist near the interfaces 52 between the transition pieces 33 while hotter areas may exist near the vanes 46B generally aligned with the combustors 30. In certain embodiments, the interfaces 52 between transition pieces 33 may include spaces that cooling air may flow through, creating cooler temperatures at the transition pieces interfaces 52. Further, the transition piece interfaces 52 may be located farther away from the hottest portions of the combustors 30. Due to these temperature differences, the vanes 46A disposed near the transition piece interfaces 52 may experience colder temperatures, while the vanes 46B disposed closer to the combustors 30 may experience hotter temperatures. According to certain embodiments, the temperature profile of the nozzle assembly 44 may be mapped using test data and models, such as computational fluid dynamic (CFD) models. Further, in certain embodiments, the temperatures experienced by the vanes 46A may be approximately 500 to 800° F. (260 to 430° C.) colder, and all subranges therebetween, than the temperatures experienced by the vanes 46B. In another example, the temperatures experienced by the vanes 46A may be approximately 10 to 50 percent colder, and all subranges therebetween, than the temperatures experienced by the vanes 46B.

The inner and outer band segments 48 and 50 and the shroud segments 68 also may experience similar temperature differences. For example, the inner and outer band segments 48A and 50A and the shroud segments 68A generally aligned with the transition piece interfaces 52 may experience colder temperatures than the inner and outer band segments 48B and 50B and the shroud segments 68B disposed between the inner and outer band segments 48A and 50A. According to certain embodiments, the band segments 48A and 50A and the shroud segments 68A may experience temperatures approximately 500 to 1200° F. (260 to 650° C.) colder, and all subranges therebetween, than the temperatures of the band segments 48B and 50B and the shroud segments 68B. In another example, the band segments 48A and 50A and the shroud segments 68A may experience temperatures approximately 10 to 70 percent colder, and all subranges therebetween, than the temperatures of the band segments 48B and 50B and the shroud segments 68B.

Because of the repeatable temperature differences between vanes 46A, band segments 48A and 50A, and shroud segments 68A disposed at or near the transition piece interfaces 52 and the vanes 46B, band segments 48B and 50B, and shroud segments 68B disposed farther from the transition piece interfaces 52, less cooling may be needed in the vanes 46A, band segments 48A and 50A, and shroud segments 68A than in the vanes 46B, band segments 48B and 50B, and shroud segments 68B. Accordingly, the vanes 46, band segments 48A and 50A, and shroud segments 68A may be designed to provide less cooling while the vanes 46B, band segments 48B and 50B, and shroud segments 68B may be designed to provide more cooling.

Figure 5:
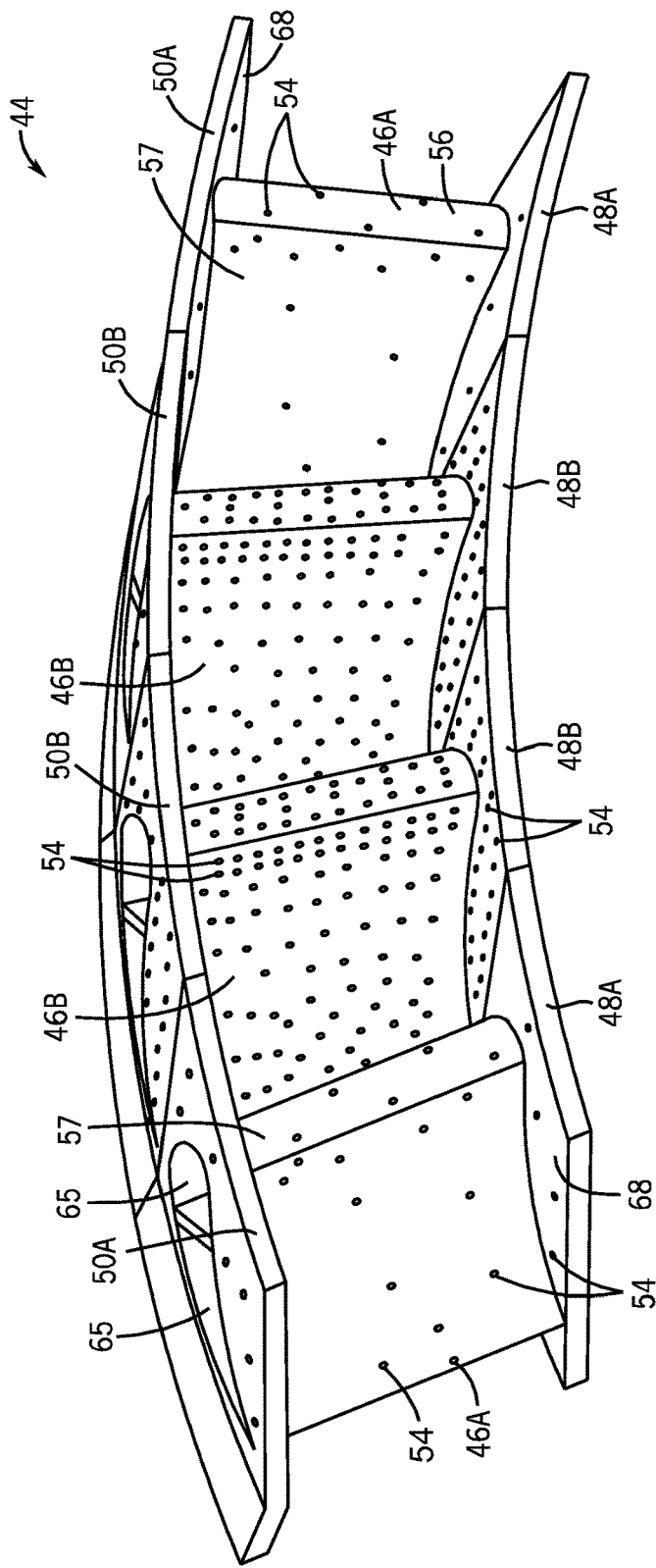
FIG. 5 is a perspective view of a portion of the turbine nozzle assembly of FIG. 3.

FIG. 5 is a perspective view of a portion of the nozzle assembly 44 depicting the vanes 46A and band segments 48A and 50A disposed in the cooler areas and depicting the vanes 46B and band segments 48B and 50B disposed in the hotter regions. According to certain embodiments, the vanes 46A and/or the band segments 48A and 50A may be constructed of one material while the vanes 46B and band segments 48B and 50B may be constructed of another material designed to withstand hotter temperatures. For example, in certain embodiments, the vanes 46A and band segments 48A and 50A may be constructed of an equiaxed crystal alloy, such as the nickel-based superalloy René® 80. In these embodiments, the vanes 46B and band segments 48B and 50B disposed in the hotter area may be constructed of a single crystal alloy, such as the nickel-based superalloy N5.

In addition to, or instead of, constructing the vanes 46 and band segments 48 and 50 of different materials, the vanes 46 and band segments 48 and 50 may be designed to provide different amounts of cooling flow. The vanes 46 and band segments 48 and 50 may include cooling holes 54 that provide impingement and/or film cooling. For example, cooling air may flow through the interior of vanes 46 and band segments 48 and 50 to provide impingement cooling. The cooling air may enter the interiors of vanes 46 and band segments 48 and 50 through one or more inlet holes (not shown). The cooling air may then exit the vanes 46 and band segments 48 and 50 through the cooling holes 54 to provide film cooling to the external surfaces of the vanes 46 and band segments 48 and 50.

The number of cooling holes 54 may be varied in the vanes 46, the inner band segments 48, the outer band segments 50, or combinations thereof. In particular, the vanes 46A and/or band segments 48A and 50A disposed in the cooler areas may have fewer cooling holes 54 than the vanes 46B and segments 48B and 50A disposed in the warmer regions. According to certain embodiments, the vanes 46A and/or band segments 48A and 50A may have approximately 10 to 90 percent, and all subranges therebetween, fewer cooling holes 54 than the vanes 46B and band segments 48B and 50B disposed in the hotter regions. In another example, the vanes 46A and/or band segments 48A and 50A may have at least approximately 10, 20, 30, 40, 50, 60, 70, 80, or 90 percent fewer cooling holes 54 than the vanes 46B and band segments 48B and 50B disposed in the hotter regions. The difference in the number of cooling holes 54 may cause more cooling flow to be directed through the vanes 46B and band segments 48B and 50B located in the hotter regions while less cooling flow is directed through the vanes 46A and band segments 48A and 50A located in the cooler regions. Some or all of the vanes 46A, the inner band segments 48A, and the outer band segments 50A may have fewer cooling holes 54 than the vanes 46B, the inner band segments 48B, and the outer band segments 50B.

In other embodiments, the relative sizes and/or shapes of the cooling holes 54 may vary to provide less cooling in the vanes 46A and/or band segments 48A and 50A than in the vanes 46B and/or band segments 48B and 50B. For example, the vanes 46A and band segments 48A and 50A may have smaller cooling holes 54 than the vanes 46B and band segments 48B and 50B. In another example, the vanes 46A and band segments 48A and 50A may have smaller circular cooling holes 54 while the vanes 46B and band segments 48B and 50B have larger non-circular (e.g., rectangular, square, or triangular, among others) cooling holes 54. In yet another example, the pattern of the cooling holes 54 may vary between the vanes 46A and/or band segments 48A and 50A and the vanes 46B and/or band segments 48B and 50B. In certain embodiments, surface features, such as convection channels and turbulators, may be included on the external surfaces of the vanes 46 and/or the band segments 48 and 50 to enhance convective cooling. In these embodiments, the number, size, shape, and/or geometry of the surface features may be varied to provide less cooling in the vanes 46A and/or band segments 48A and 50A than in the vanes 46B and/or band segments 48B and 50B.

According to certain embodiments, the total area of the cooling hole openings in the vanes 46A and/or the band segments 48A and 50A may be approximately 10 to 90 percent, and all subranges therebetween, of the total area of the cooling hole openings in the vanes 46B and/or the band segments 48B and 50B. Further, in other embodiments, the geometry of the cooling holes 54 may vary between the vanes 46A and band segments 48A and 50A disposed in the cooler regions and the vanes 46B and band segments 48B and 50B disposed in the hotter regions. For example, in certain embodiments, the cooling holes 54 disposed on an interface side 56 of the vanes 46A, which is closest to the transition piece interface 52 (FIG. 4) may be angled to direct cooling flow away from the transition piece interface 52 and towards the vanes 46B disposed in the hotter regions. Further, in certain embodiments, the cooling holes 54 located on the non-interface side 57 of the vanes 46A also may be angled toward the vanes 46B.

Figure 6:
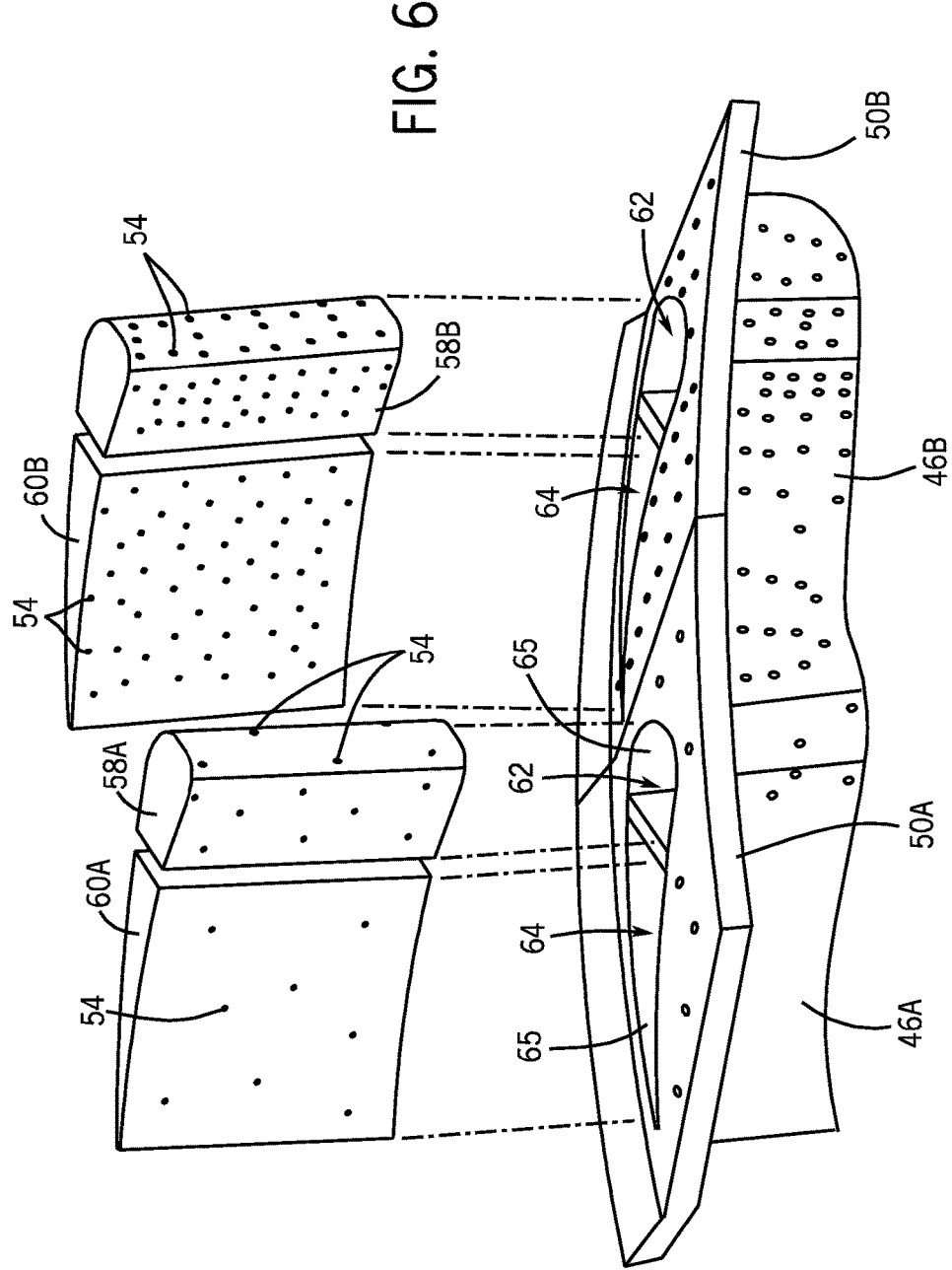
FIG. 6 is a perspective view of vane inserts that may be employed in the turbine nozzle assembly of FIG. 3.

In addition to, or instead of, varying the number, shapes, and/or sizes of cooling holes 54 located on the vanes 46 and band segments 48 and 50, the number of cooling holes 54 included on vane inserts 58 and 60 may be varied, as shown in FIG. 6. Each vane 46 may be hollow and may include openings 62 and 64 for receiving inserts 58 and 60. The inserts 58 and 60 also may be hollow and may receive cooling air from the compressor. In particular, the cooling air may enter the interior of the inserts 58 and 60 and may flow outward to the interior walls 65 of the vanes 46 through the cooling holes 54 within the inserts 58 and 60. The cooling air may then exit the vanes 46 through the cooling holes 54 included within the vanes 46. According to certain embodiments, the inserts 58 and 60 may be brazed or otherwise affixed to the interior walls of the vanes 46. Further, in other embodiments, any number of inserts 58 and 60 may be employed within the vanes 46.

As shown in FIG. 6, the inserts 58A and 60A for the vanes 46A disposed in the cooler regions may include fewer cooling holes 54 than the inserts 58B and 60B for the vanes 46B in the hotter regions. According to certain embodiments, the inserts 58A and 60A may include approximately 10 to 90 percent, and all subranges therebetween, fewer cooling holes 54 than the inserts 58B and 60B. Further, in other embodiments, the size and/or shape of the cooling holes 54 may be varied between the inserts 58A and 60A and the inserts 58B and 60B to provide less cooling flow in the inserts 58A and 60A than in the inserts 58B and 60B. Moreover, in other embodiments, the geometry of the cooling holes 54 may be varied in the inserts 58A and 60A to direct the cooling flow toward the non-interface side 57 (FIG. 5) of the vanes 46. Further, in certain embodiments, the cooling holes 54 in the inserts 58 and 60 may be connected to internal passages that may be varied in size and/or shape between the inserts 58A and 60A and the inserts 58B and 60B.

Figure 7:
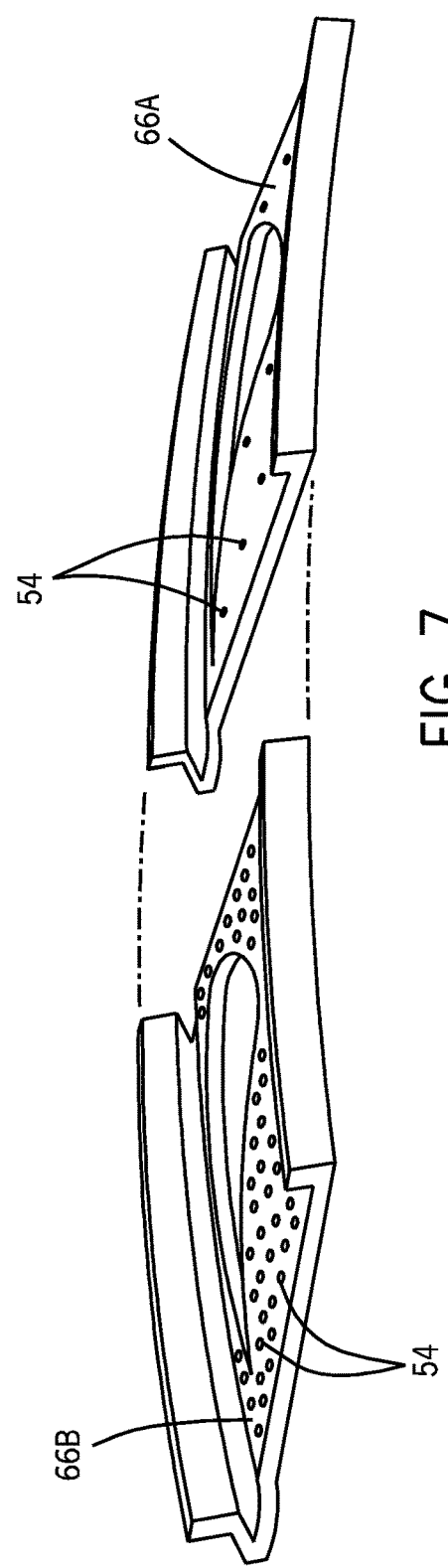
FIG. 7 is a perspective view of band impingement covers that may be employed in the turbine nozzle assembly of FIG. 3.

As shown in FIG. 7, the number of cooling holes 54 in band covers 66 also may be varied to provide preferential cooling. The band covers 66 may be disposed over the interior surfaces 68 (FIG. 5) of the band segments 48 and 50 and may provide additional cooling to the band segments 48 and 50. The number of cooling holes 54 may vary between the band covers 66B disposed in the hotter regions and the band covers 66A disposed in the cooler regions. According to certain embodiments, the band covers 66A may include approximately 10 to 90 percent, and all subranges therebetween, fewer cooling holes 54 than the band covers 66B. Further, in other embodiments, the size, shape, and/or geometry of the cooling holes 54 may vary between the band covers 66A and 66B. For example, the band covers 66A disposed in the cooler region may include smaller cooling holes 54 than the band covers 66B disposed in the hotter regions. Further, in another example, the band covers 66A disposed in the cooler regions may include cooling holes 54 designed to direct flow towards the band covers 66B disposed in the warmer regions.

Figure 8:
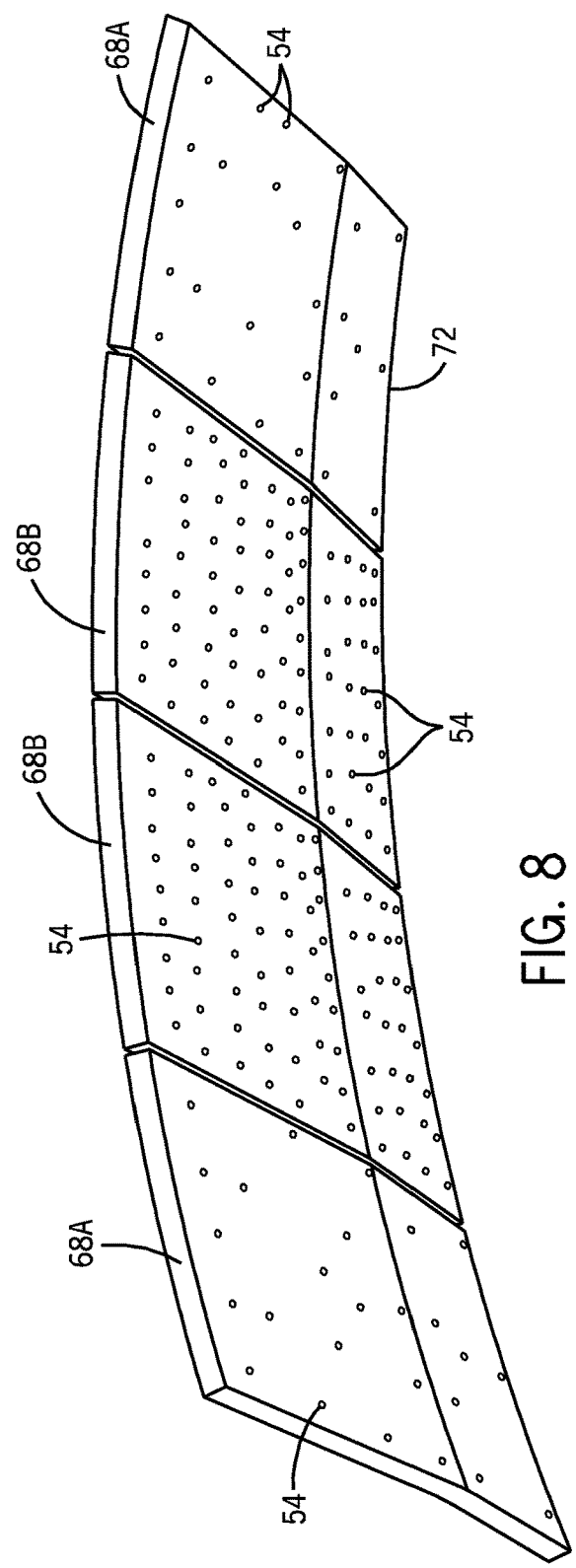
FIG. 8 is a perspective view of another portion of the shroud assembly of FIG. 3.

FIG. 8 is a perspective view of a portion of the nozzle assembly 44 depicting the shroud segments 68A disposed in the cooler areas and the shroud segments 68B disposed in the hotter regions. According to certain embodiments, the shroud segments 68A may be constructed of one material while the shroud segments 68B may be constructed of another material designed to withstand hotter temperatures. For example, in certain embodiments, the shroud segments 68A may be constructed of an equiaxed crystal alloy, such as the nickel-based superalloy René® 80. In these embodiments, the shroud segments 68B disposed in the hotter area may be constructed of a single crystal alloy, such as the nickel-based superalloy N5.

In addition to, or instead of, constructing the shroud segments 68 of different materials, the shroud segments 68 may be designed to provide different amounts of cooling flow. Similar to the vanes 46 and the band segments 48 and 50, the shroud segments 68 may include cooling holes 54 that provide impingement and/or film cooling. The number of cooling holes 54 may be varied in the shroud segments 68 to provide preferential cooling. In particular, the shroud segments 68A disposed in the cooler areas may have fewer cooling holes 54 than the shroud segments 68B disposed in the warmer regions. According to certain embodiments, the shroud segments 68A may have approximately 10 to 90 percent, and all subranges therebetween, fewer cooling holes 54 than the shroud segments 68B disposed in the hotter regions. In another example, the shroud segments 68A may have at least approximately 10, 20, 30, 40, 50, 60, 70, 80, or 90 percent fewer cooling holes 54 than the shroud segments 68B disposed in the hotter regions. The difference in the number of cooling holes 54 may cause more cooling flow to be directed through the shroud 68B located in the hotter regions while less cooling flow is directed through the shroud segments 68A located in the cooler regions.

In other embodiments, the relative sizes, shapes, and/or geometries of the cooling holes 54 may vary to provide less cooling in the shroud segments 68A than in the shroud segments 68B. For example, the shroud segments 68A may have smaller cooling holes 54 than the shroud segments 68B. In another example, the shroud segments 68A may have smaller circular cooling holes 54 while the shroud segments 68B have larger non-circular (e.g., rectangular, square, or triangular, among others) cooling holes 54. In yet another example, the pattern of the cooling holes 54 may vary between the shroud segments 68A and the shroud segments 68B. Further, in another example, the shroud segments 68A disposed in the cooler regions may include cooling holes 54 designed direct flow towards the shroud segments 68B disposed in the warmer regions. According to certain embodiments, the total area of the cooling hole openings in the shroud segments 68A may be approximately 10 to 90 percent, and all subranges therebetween, of the total area of the cooling hole openings in the shroud segments 68B.

Figure 9:
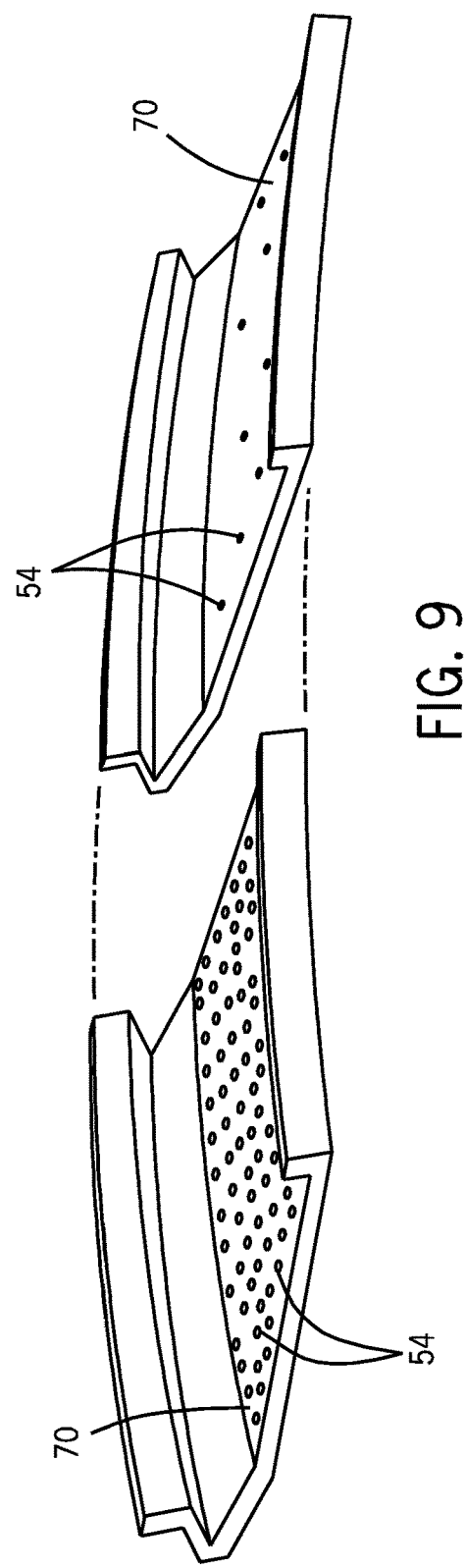
FIG. 9 is a perspective view of shroud impingement covers that may be employed in the turbine nozzle assembly of FIG. 3.

As shown in FIG. 9, the number of cooling holes 54 in shroud covers 70 also may be varied to provide preferential cooling. The shroud covers 70 may be disposed over the interior surfaces 72 (FIG. 8) of the shroud segments 68 and may provide additional cooling to the shroud segments 68. The number of cooling holes 54 may vary between the shroud covers 70B disposed in the hotter regions and the shroud covers 70A disposed in the cooler regions. According to certain embodiments, the shroud covers 70A may include approximately 10 to 90 percent, and all subranges therebetween, fewer cooling holes 54 than the shroud covers 70B. Further, in other embodiments, the size, shape, and/or geometry of the cooling holes 54 may vary between the shroud covers 70A and 70B. For example, the shroud covers 70A disposed in the cooler region may include smaller cooling holes 54 than the shroud covers 70B disposed in the hotter regions. Further, in another example, the shroud covers 70A disposed in the cooler regions may include cooling holes 54 designed direct flow towards the shroud covers 70B disposed in the warmer regions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine engine, comprising:
   a turbine nozzle assembly with a plurality of circumferentially spaced first components and second components; and
   a plurality of transition pieces each defining a hot gas path from a combustor of a plurality of combustors to the turbine nozzle assembly, wherein the plurality of transition pieces are arranged circumferentially about a rotational axis of the turbine engine in a plurality of pairs of adjacent transition pieces, and each pair of adjacent transition pieces of the plurality of transition pieces has an interface circumferentially between the adjacent transition pieces in the pair of adjacent transition pieces;
   wherein the first components are aligned with the interfaces, the second components are disposed between the interfaces and are aligned with the hot gas paths from the plurality of combustors through openings of individual transition pieces of the plurality of transition pieces, and the second components are configured to be cooled more than the first components, wherein the first components comprise first band segments aligned with the interfaces, the second components comprise second band segments aligned with the openings, and the first band segments have fewer cooling holes than the second band segments.

2. The turbine engine of claim 1, wherein the first components and the second components comprise turbine nozzle vanes.

3. The turbine engine of claim 1, wherein the first components and the second components comprise turbine nozzle shroud segments.

4. The turbine engine of claim 1, wherein the first components and the second components comprise inserts for turbine nozzle vanes.

5. The turbine engine of claim 1, wherein the first band segments comprise first inner and outer band segments, and the second band segments comprise second inner and outer band segments.

6. The turbine engine of claim 1, wherein the first components are constructed of an equiaxed alloy, and the second components are constructed of a single crystal alloy.

7. The turbine engine of claim 1, wherein each of the first components is disposed between a pair of the second components.

8. The turbine engine of claim 1, comprising a compressor, wherein the first and second components are configured to receive cooling air from the compressor.

9. The turbine engine of claim 1, comprising the plurality of combustors arranged circumferentially about the rotational axis of the turbine engine.

10. The turbine engine of claim 1, wherein the first components further comprise first vanes aligned with the interfaces between pairs of the transition pieces of the plurality of transition pieces, the second components further comprise second vanes aligned with the openings of individual transition pieces of the plurality of transition pieces, and the first vanes have fewer cooling holes than the second vanes.

11. The turbine engine of claim 1, wherein the first components comprise at least one nozzle vane having a first insert and a second insert, and at least one of the first or second inserts comprises cooling holes.

12. A turbine engine, comprising:
   a turbine nozzle assembly with a plurality of circumferentially spaced vanes each extending between a plurality of band segments;
   a plurality of transition pieces each defining a hot gas path from a combustor to the turbine nozzle assembly, wherein the plurality of transition pieces are arranged circumferentially about a rotational axis of the turbine engine in a plurality of pairs of adjacent transition pieces, and each pair of adjacent transition pieces of the plurality of transition pieces has an interface circumferentially between the adjacent transition pieces in the pair of adjacent transition pieces;
   a first component comprising at least one vane of the plurality of circumferentially spaced vanes or at least one first band segment of the plurality of band segments; and
   a second component comprising at least one vane of the plurality of circumferentially spaced vanes or at least one second band segment of the plurality of band segments, wherein the first component is disposed between the interfaces in the hot gas path from the combustor to the turbine nozzle assembly, the second component is disposed at or adjacent to one of the interfaces, and the second component is configured to be cooled less than the first component;

wherein the at least one second band segment includes a cover configured to reduce cooling of the at least one second band segment with respect to the at least one first band segment.

13. The turbine engine of claim 12, wherein the second component comprises less cooling holes than the first component.

14. The turbine engine of claim 12, wherein the plurality of band segments are disposed adjacent to one another to form an annular ring.

15. The turbine engine of claim 12, wherein the at least one first band segment comprises a first number of cooling holes and the at least one second band segment comprises a second number of cooling holes, and the second number of cooling holes is less than the first number of cooling holes.

16. The turbine engine of claim 12, wherein the first component further comprises a first vane of the at least one vane of the plurality of circumferentially spaced vanes aligned with an opening in one of the plurality of transition pieces, the second component further comprises a second vane of the at least one vane of the plurality of circumferentially spaced vanes aligned with the one of the interfaces, and the second vane has fewer cooling holes than the first vane.

17. A turbine engine, comprising:
a turbine nozzle assembly comprising:
 a first annular ring of band segments;
 a second annular ring of band segments;
 a plurality of first vanes extending between the first and second annular rings of band segments; and
 a plurality of second vanes extending between the first and second annular rings of band segments;
a plurality of combustors; and
a plurality of transition pieces each defining a hot gas path from each respective combustor of the plurality of combustors to the turbine nozzle assembly, wherein the plurality of transition pieces are arranged circumferentially about a rotational axis of the turbine engine in a plurality of pairs of adjacent transition pieces, and each pair of adjacent transition pieces of the plurality of transition pieces has an interface circumferentially between the adjacent transition pieces in the pair of adjacent transition pieces;

wherein individual first vanes of the plurality of first vanes are aligned with the interfaces, individual second vanes of the plurality of second vanes are disposed between the interfaces and are aligned with the hot gas paths from the combustors through openings of individual transition pieces of the plurality of transition pieces, and the individual first vanes of the plurality of first vanes comprise fewer cooling holes than the individual second vanes of the plurality of second vanes;

wherein at least one of the first or second annular rings of band segments comprises first band segments aligned with the interfaces and second band segments disposed between the first band segments, wherein the first band segments comprise fewer cooling holes than the second band segments.

18. The turbine engine of claim 17, wherein the individual first vanes of the plurality of first vanes comprise at least 50 percent fewer cooling holes than the individual second vanes of the plurality of second vanes.

19. The turbine engine of claim 17, wherein the individual first vanes of the plurality of first vanes comprise at least 80 percent fewer cooling holes than the individual second vanes of the plurality of second vanes.

20. The turbine engine of claim 17, wherein the first annular ring of band segments is an inner annular ring having first and second inner band segments, the second annular ring of band segments is an outer annular ring having first and second outer band segments, the first band segments are part of both the first and second annular rings of band segments, the first band segments comprise the first inner band segments of the first annular ring of band segments and the first outer band segments of the second annular ring of band segments aligned with the interfaces between two transition pieces of the plurality of the transition pieces, the second band segments are part of both the first and second annular rings of band segments, and the second band segments comprise the second inner band segments of the first annular ring of band segments disposed between the first inner band segments and the second outer band segments of the second annular ring of band segments disposed between the first outer band segments.

\* \* \* \* \*